United States Patent
Zebiak et al.

(10) Patent No.: US 12,384,367 B2
(45) Date of Patent: Aug. 12, 2025

(54) ENERGY-OPTIMIZED CRUISE CONTROL WITH SPEED FLEXIBILITY

(71) Applicant: GM Global Technology Operations LLC, Detroit, MI (US)

(72) Inventors: Matthew Stephen Zebiak, Ann Arbor, MI (US); Amanpal S. Grewal, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 18/304,806

(22) Filed: Apr. 21, 2023

(65) Prior Publication Data

US 2024/0351584 A1   Oct. 24, 2024

(51) Int. Cl.
*B60W 30/14* (2006.01)
*B60W 10/04* (2006.01)
*B60W 40/06* (2012.01)

(52) U.S. Cl.
CPC .......... *B60W 30/146* (2013.01); *B60W 10/04* (2013.01); *B60W 40/06* (2013.01); *B60W 2552/15* (2020.02)

(58) Field of Classification Search
CPC .... B60W 30/146; B60W 10/04; B60W 40/06; B60W 2552/15
See application file for complete search history.

(56) References Cited

U.S. PATENT DOCUMENTS

| | | | |
|---|---|---|---|
| 2012/0309585 A1* | 12/2012 | Whitney | F16H 63/50 477/3 |
| 2020/0269689 A1 | 8/2020 | Zebiak et al. | |
| 2020/0290610 A1* | 9/2020 | Grewal | B60W 50/0097 |
| 2020/0398810 A1 | 12/2020 | Zebiak et al. | |
| 2021/0245748 A1 | 8/2021 | Zebiak et al. | |
| 2022/0176827 A1* | 6/2022 | Otanez | B60K 17/00 |

FOREIGN PATENT DOCUMENTS

| | | |
|---|---|---|
| DE | 102020103644 A1 | 9/2020 |
| DE | 102021111699 A1 | 6/2022 |

* cited by examiner

*Primary Examiner* — Todd Melton
*Assistant Examiner* — Oliver Tan
(74) *Attorney, Agent, or Firm* — Vivacqua Crane, PLLC

(57) ABSTRACT

A cruise control method for a vehicle includes receiving a set speed and determining a commanded axle torque to maintain the set speed on a road that is flat. The method further includes commanding a propulsion system of the vehicle to produce the commanded axle torque to maintain the set speed and applying a fading memory filter to the commanded axle torque to generate a filtered torque command. The method further includes determining an arbitrated torque command as a function of the filtered torque command and command the propulsion system of the vehicle to produce the arbitrated torque command. Also, the method includes determining that a slope of the road is greater than a predetermined slope threshold, setting a temporary set speed, and commanding the propulsion system of the vehicle to maintain the vehicle at the temporary speed.

17 Claims, 6 Drawing Sheets

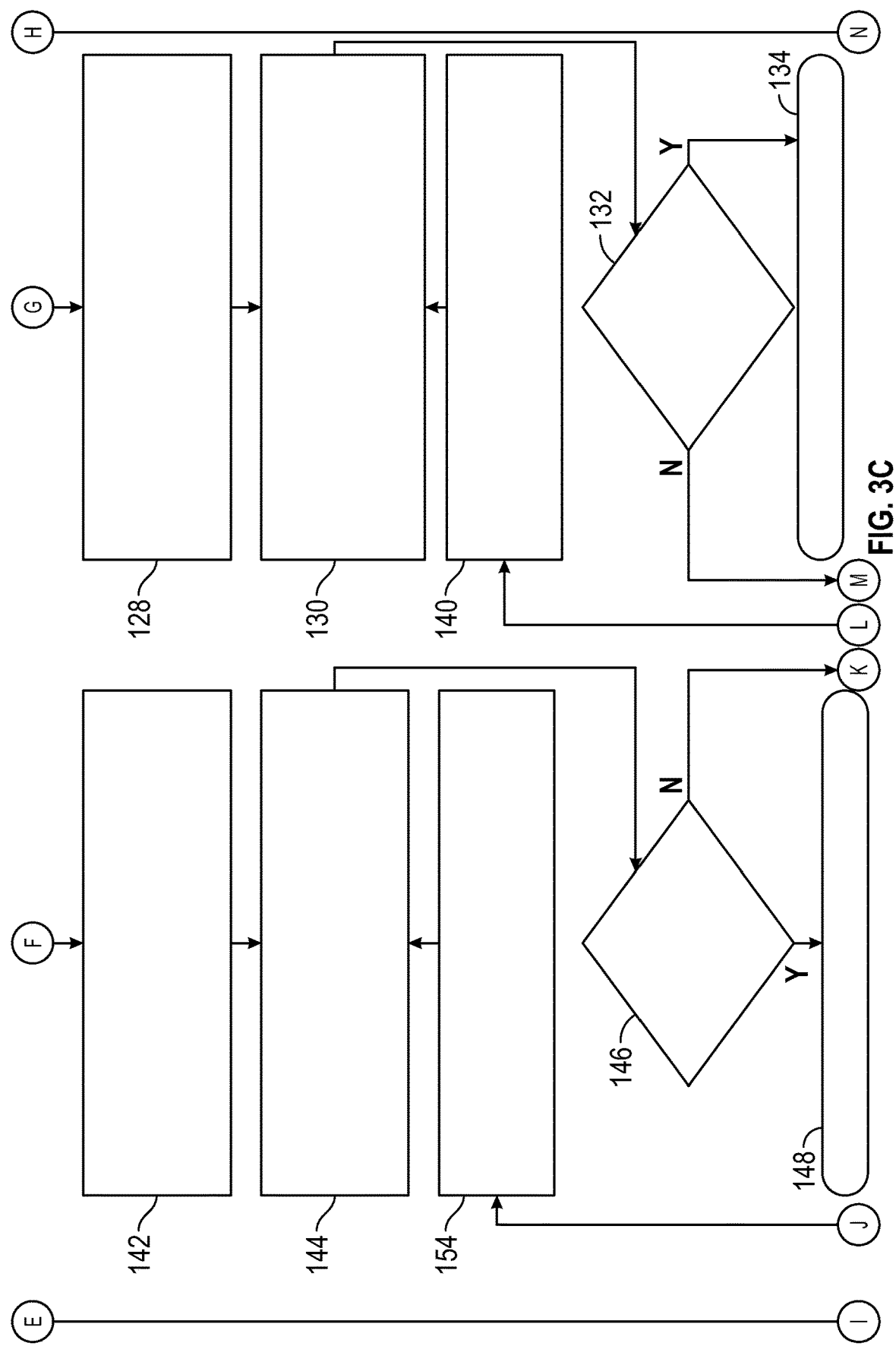

ENERGY-OPTIMIZED CRUISE CONTROL WITH SPEED FLEXIBILITY

INTRODUCTION

The present disclosure relates to a system and method for cruise control.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Cruise control is currently calibrated to rigidly control a driver's set speed and can be aggressive and inefficient in its attempt to maintain that speed on changes in road grades. This leads to lower fuel economy and unnatural behavior (e.g., aggressive tip-ins and downshifts while going up hills, riding the brakes down hills, etc.).

SUMMARY

The present disclosure relates to a system and method for cruise control. In an aspect of the present disclosure, the cruise control method for a vehicle includes receiving a set speed, a maximum allowed speed, and a minimum allowed speed. The maximum allowed speed and the minimum allowed speed define an allowed speed range. The method includes determining a commanded axle torque to maintain the set speed on a road that is flat, commanding a propulsion system of the vehicle to produce the commanded axle torque to maintain the set speed on the road that is flat, monitoring the axle torque command of the conventional PID cruise control system, applying a fading memory filter to this conventional-cruise commanded axle torque to generate a filtered torque command, determining an arbitrated torque command as a function of the filtered torque command, commanding the propulsion system of the vehicle to produce the arbitrated torque command, determining that the present vehicle speed is within a calibratable threshold of the allowed vehicle speed boundary, setting a temporary set speed in response to determining that the present vehicle speed is within a calibratable threshold of the allowed vehicle speed boundary, and commanding the propulsion system of the vehicle to maintain the vehicle at the temporary speed while the vehicle travels along the slope of the road.

In an Aspect of the Present Disclosure, the Arbitrated Torque Command is Based on the Filtered Torque Command Using the Following Equations in Sequential Order:

$$\tau_{arb} = \min[\tau_{maxcomp}, \tau_{flt}]$$

$$\tau_{arb} = \max[\tau_{arb}, \tau_{mincomp}]$$

where:

$\tau_{arb}$ is the arbitrated torque command;
$\tau_{flt}$ is the filtered torque command;
$\tau_{maxcomp}$ is a predetermined maximum calibration value; and
$\tau_{mincomp}$ is a predetermined minimum calibration value.

In an aspect of the present disclosure, determining that the slope of the road is greater than a predetermined slope threshold includes detecting an incline on the road that is greater than the slope threshold.

In an aspect of the present disclosure, determining the incline on the road includes determining that an acceleration of the vehicle is less than a predetermined acceleration threshold.

In an aspect of the present disclosure, detecting that the incline on the road is sufficiently high includes determining that a speed of the vehicle is less than a predetermined speed threshold.

In an aspect of the present disclosure, determining that the slope of the road is greater than a predetermined slope threshold includes detecting a decline on the road that is greater than the slope threshold.

In an aspect of the present disclosure, detecting the decline on the road that is greater than the slope threshold includes determining that an acceleration of the vehicle is greater than a predetermined acceleration threshold.

In an aspect of the present disclosure, detecting the decline on the road that is greater than the slope threshold includes determining that a speed of the vehicle is greater than a predetermined speed threshold.

The present disclosure also describes a system including sensors and a controller in communication with the sensors. The controller is programmed to execute the method described above.

The present disclosure also describes a tangible, non-transitory, machine-readable medium, comprising machine-readable instructions, that when executed by a processor, causes the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 3C is part of the flowchart of the cruise control method of FIG. 3A; and

DETAILED DESCRIPTION

Figure 1:
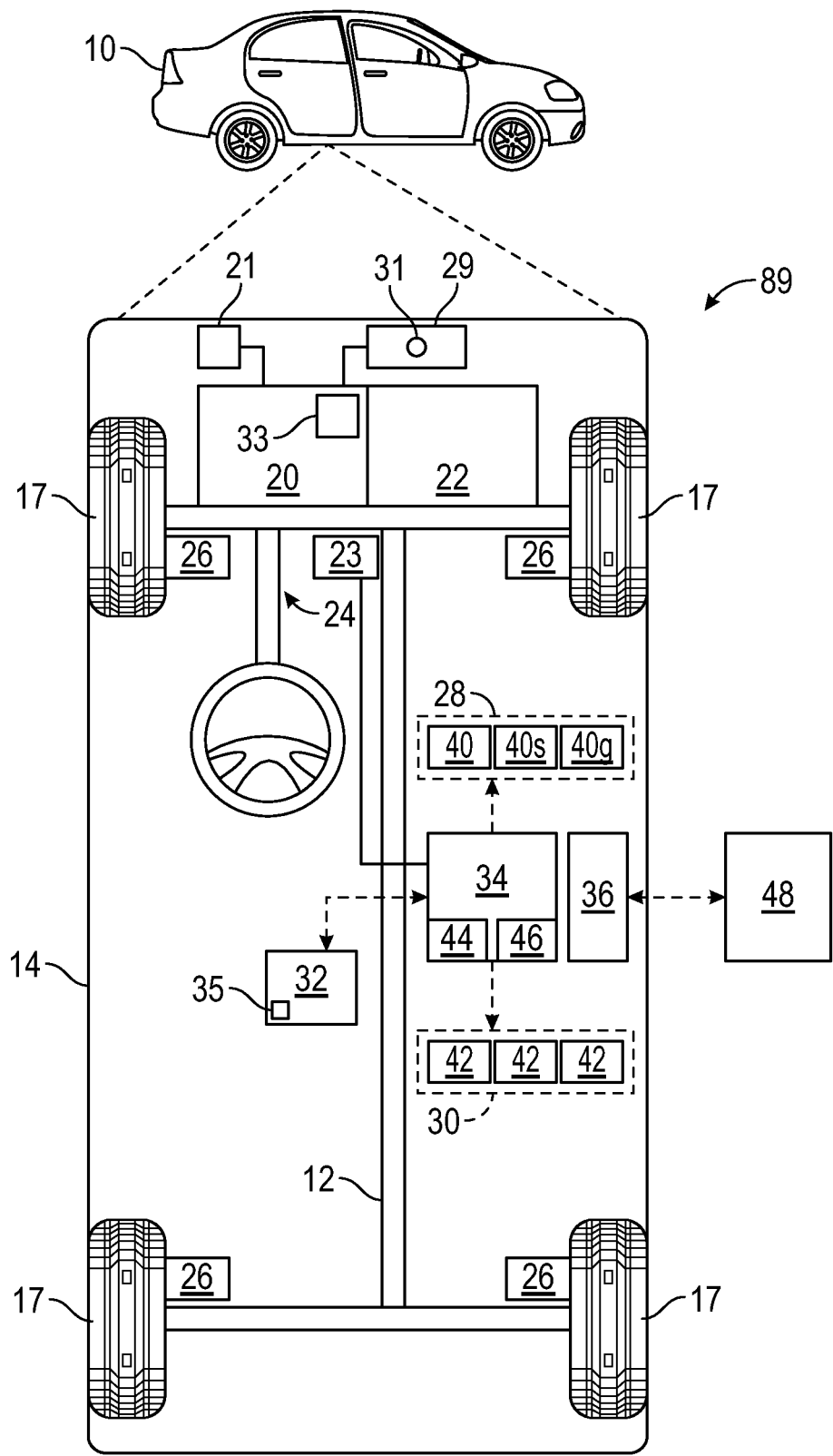
FIG. 1 is a schematic diagram depicting an embodiment of a vehicle including a system for cruise control.

Reference will now be made in detail to several examples of the disclosure that are illustrated in accompanying drawings. Whenever possible, the same or similar reference numerals are used in the drawings and the descriptions to refer to the same or like parts or steps.

As depicted in FIG. 1, a vehicle 10 generally includes a chassis 12, a body 14, front and rear wheels 17 and may be referred to as the host vehicle. The vehicle 10 may be referred to as a motor vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 may be an autonomous vehicle, and a cruise control system 89 is incorporated into the vehicle 10. The cruise control system 89 may alternatively be referred to as a vehicle system. The vehicle 10 is, for example, a vehicle that is automatically controlled to carry passengers from one location to another. The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used. The vehicle 10 may be a so-called Level Four or Level Five automation system. A Level Four system indicates "high automation", referring to the driving mode-specific performance by an automated driving system of the aspects of the dynamic driving task, even if a human driver does not respond appropriately to a request to intervene. A Level Five system indicates "full automation", referring to the full-time performance by an automated driving system of the aspects of the dynamic driving task under different roadway and environmental conditions that can be managed by a human driver.

The vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine 33 having a plurality of cylinders. When the propulsion system 20 engages active fuel management (AFM), not all of the cylinders of the internal combustion engine 33 are active. Conversely, when the propulsion system disengages AFM, all of the cylinders of the internal combustion engine 33 are active. The transmission system 22 is configured to transmit power from the propulsion system 20 to the vehicle wheels 17 according to selectable speed ratios. The transmission system 22 may include a step-ratio automatic transmission, a continuously-variable transmission, or other appropriate transmission. The brake system 26 is configured to provide braking torque to the vehicle wheels 17. The brake system 26 may include friction brakes, brake by wire, a regenerative braking system such as an electric machine, and/or other appropriate braking systems. The steering system 24 influences the position of the vehicle wheels 17. While depicted as including a steering wheel for illustrative purposes, the steering system 24 may not include a steering wheel. The vehicle 10 may include an air-conditioning system 29 with a compressor 31 coupled to the internal combustion engine 33 of the propulsion system 20. The compressor 31 may be driven by the internal combustion engine 33.

The sensor system 28 includes one or more sensing devices 40 that sense observable conditions of the exterior environment and/or the interior environment of the vehicle 10. The sensing devices 40 may include, but are not limited to, radars, lidars, global positioning systems, optical cameras, thermal cameras, ultrasonic sensors, clocks for measuring time, and/or other sensors. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensing system 28 includes one or more Global Positioning System (GPS) transceiver 40g configured to detect and monitor the route data (i.e., route information). The GPS transceiver 40g is configured to communicate with a GPS to locate the position of the vehicle 10 in the globe. The GPS transceiver 40g is in electronic communication with the controller 34.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 34 in controlling the vehicle 10. The data storage device 32 and/or the computer readable storage device or media 46 may include a map database 35. In the present disclosure, the term 'map database" means a database that stores geographical and topographical data, such as roads, streets, cities, parks, traffic signs, elevation information, two-dimensional or three-dimensional arrangement of objections with attributes to location and category. The map database 35 includes data about the elevation E of a terrain Trr (FIG. 3A-FIG. 3D) at predetermined-upcoming locations of the vehicle 10. The data about the elevation E of a terrain Trr (FIG. 3A-FIG. 3D) at the predetermined-upcoming locations of the vehicle 10 is referred herein as upcoming elevation data ED. In the present disclosure, the terrain Trr is the terrain Trr in which the vehicle 10 is traveling or will be traveling. The map database 35 may alternatively be referred to as the map module.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the cruise control system 89. The vehicle 10 includes a user interface 23, which may be a touchscreen in the dashboard. The user interface 23 is in electronic communication with the controller 34 and is configured to receive inputs from a user (e.g., vehicle operator). Accordingly, the controller 34 is configured to receive inputs from the user via the user interface 23. The user interface 23 includes a display configured to display information to the user (e.g., vehicle operator or passenger).

The communication system 36 is configured to wirelessly communicate information to and from other entities 48, such as but not limited to, other vehicles ("V2V" communication), infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the cruise control system 89, which is configured to control the vehicle 10. The controller 34 of the cruise control system 89 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include internal combustion engine 33 and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors 40s configured to measure and monitor the speed (or velocity) of the vehicle 10. The speed sensor 40s is coupled to the controller 34 and is in electronic communication with one or more wheels 17. Accordingly, the controller 34 is programmed to monitor the speed of the vehicle 10 based on the input from the speed sensor 40s.

Figure 2:
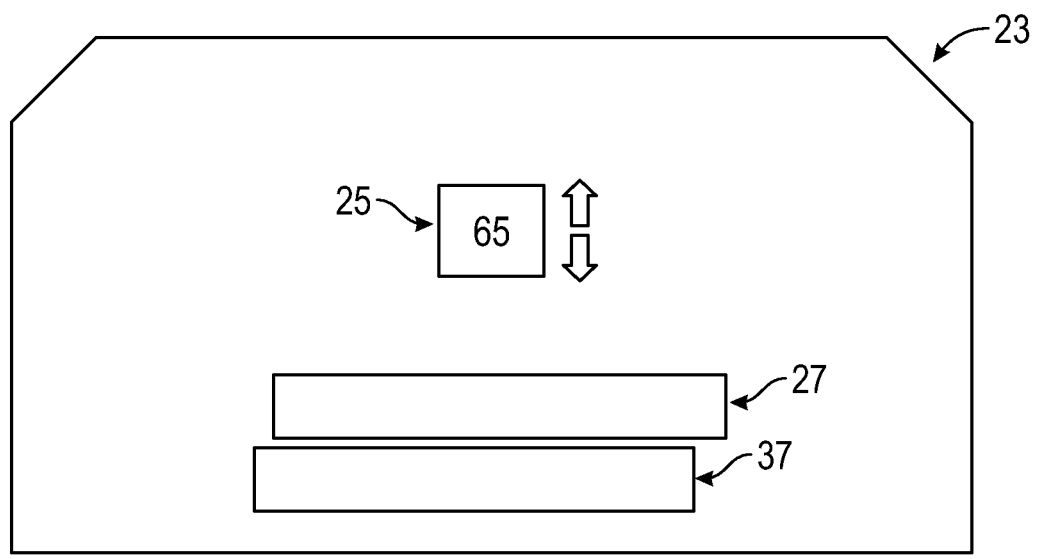
FIG. 2 is a schematic front view of a user interface of the vehicle of FIG. 1.
Figure 3A:
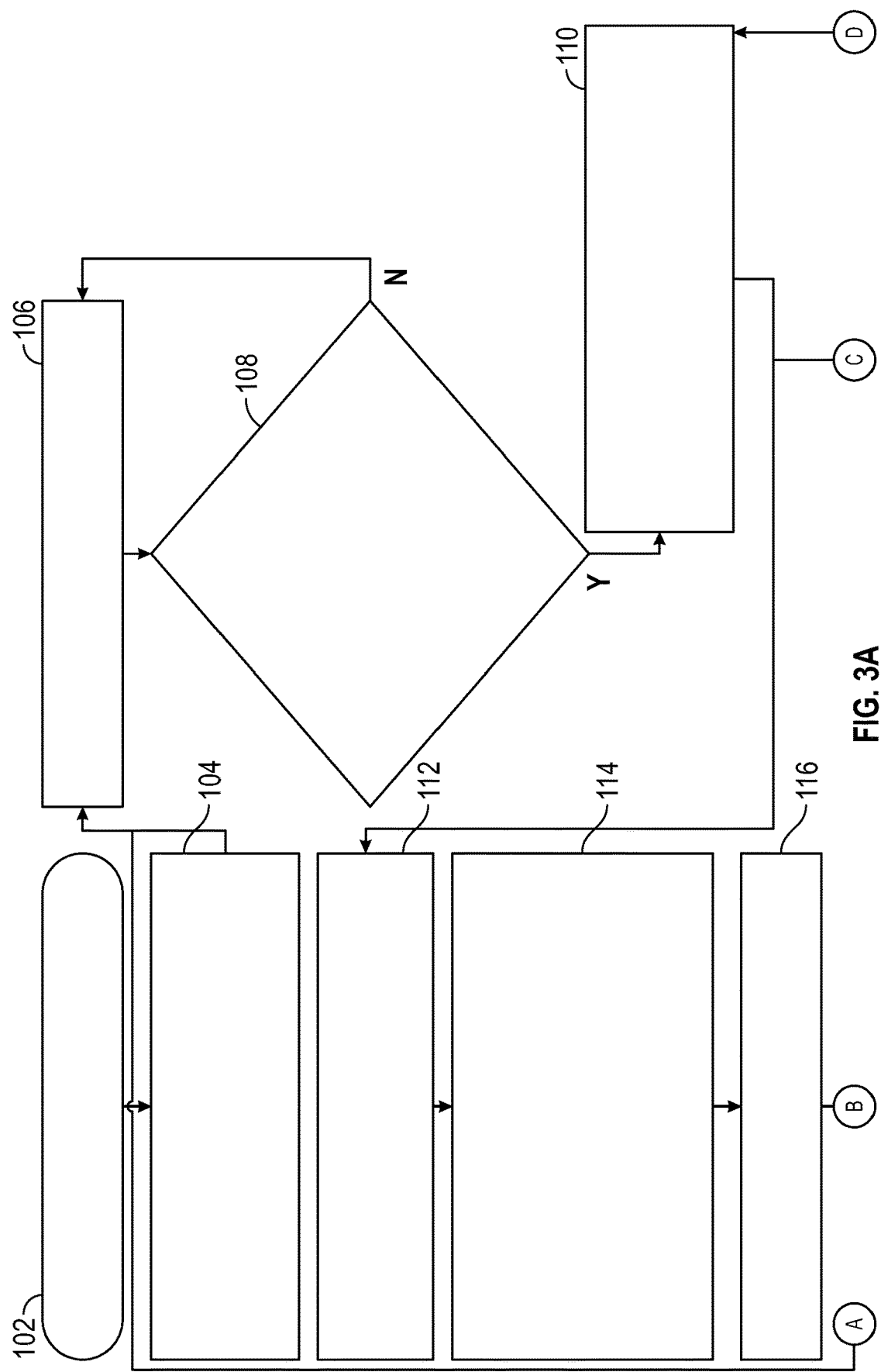
FIG. 3A is part of a flowchart of a cruise control method.
Figure 3B:
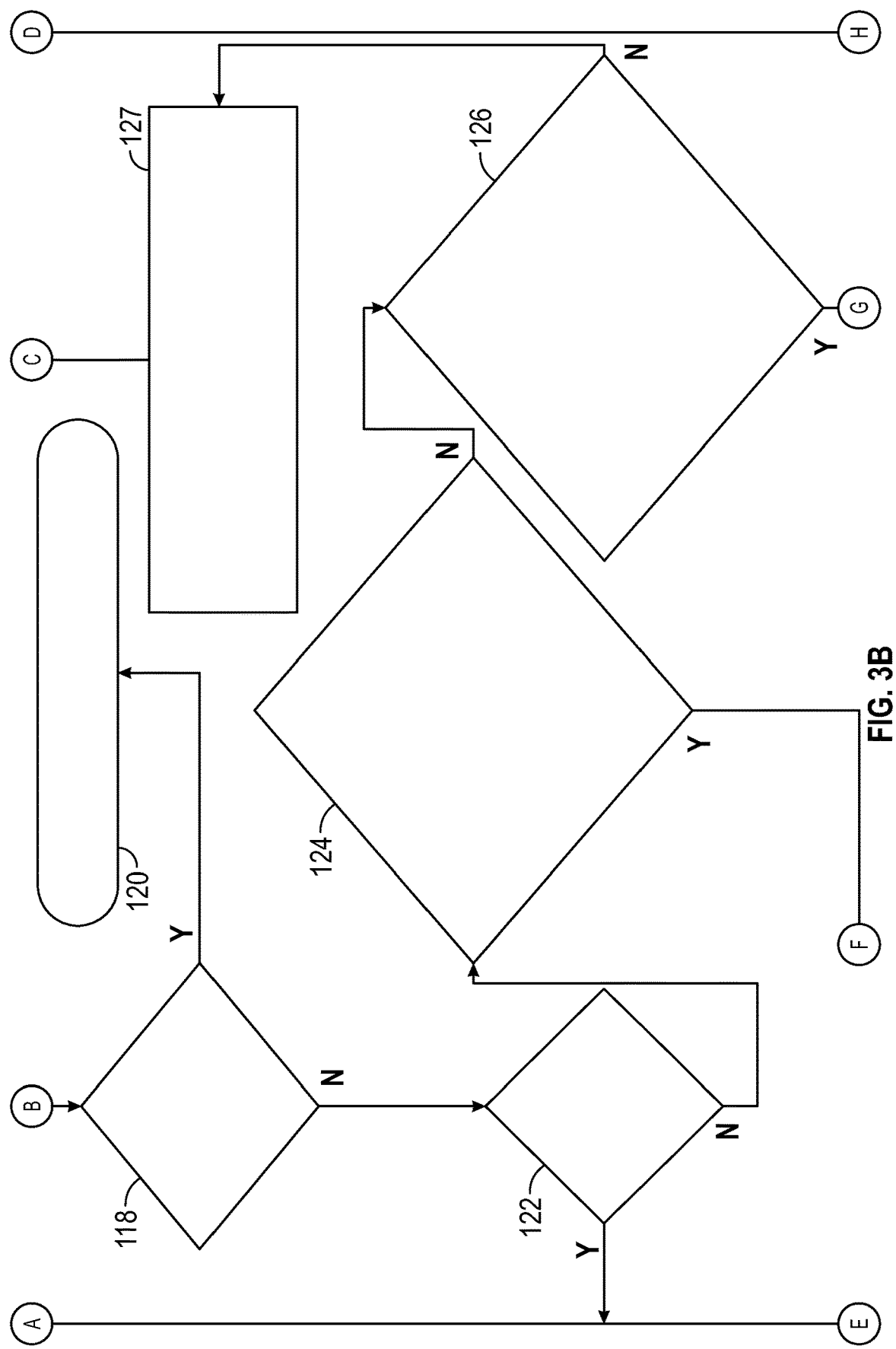
FIG. 3B is part of the flowchart of the cruise control method of FIG. 3A.
Figure 3D:
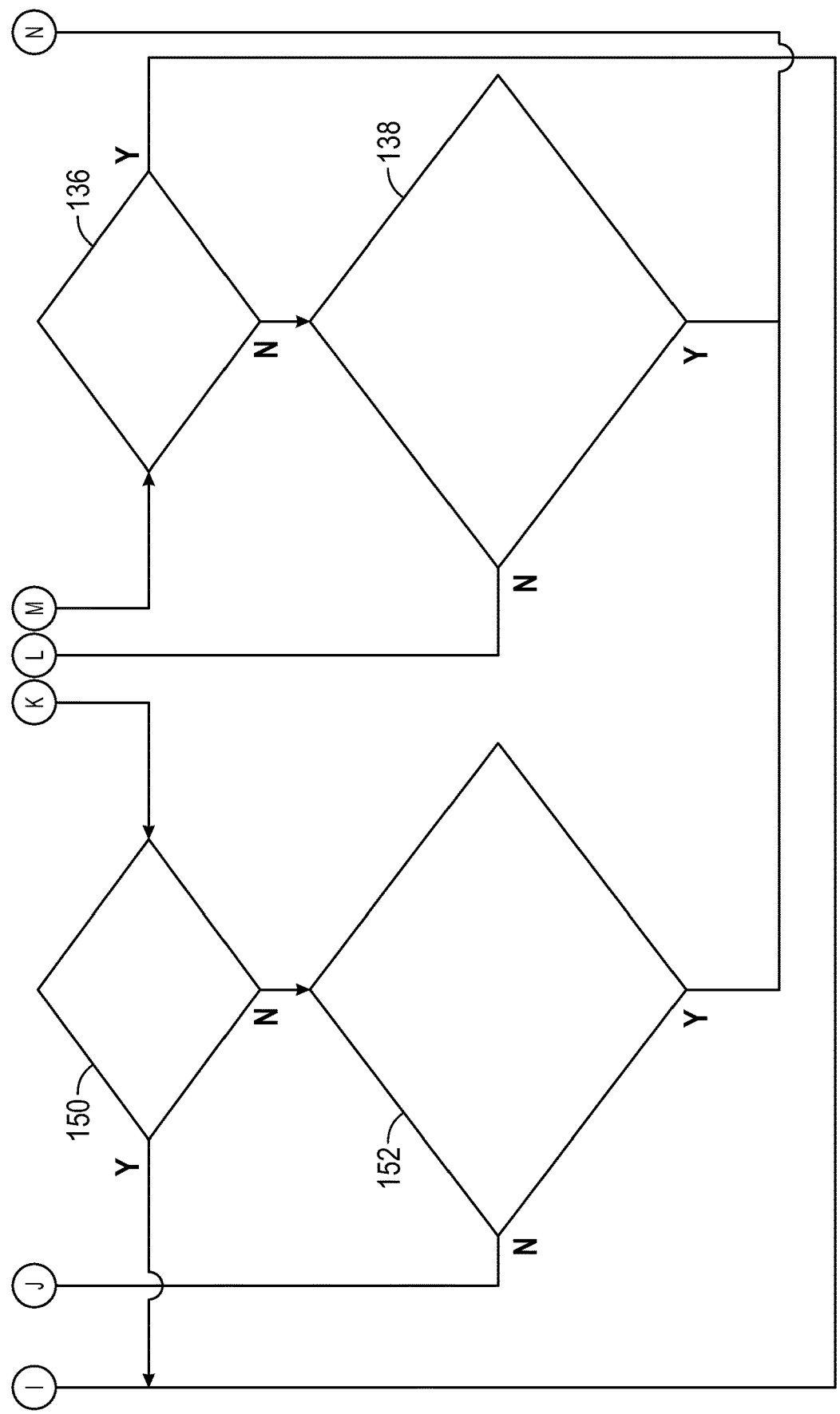
FIG. 3D is part of the flowchart of the cruise control method of FIG. 3A.

FIG. 2 is a schematic diagram of part of the user interface 23. The vehicle 10 has cruise control, and the driver's set speed 25 (shown in the user interface 23) can be adjusted by the vehicle occupant with, for example, up/down arrows on the steering wheel of the vehicle 10. Aside from the driver's set speed 25, the user interface 23 also shows the speed tolerance 27, which includes a maximum and minimum speed allowed deviation. The vehicle occupant may adjust the maximum and minimum speed allowed deviation using the user interface 23. The user interface 23 shows the allowed speed range 37, which is calculated as a function of the set speed, the maximum allowed speed, and the minimum allowed speed. The maximum allowed speed and the minimum allowed speed are each a speed boundary of an allowed speed range 37.

With reference to FIGS. 1 and 2, cruise control is currently calibrated to rigidly control to a driver's set speed, and can be aggressive and inefficient in its attempts to maintain that speed on changing road grades. This leads to lower fuel economy or electric vehicle (EV) efficiency for customers, and unnatural behavior (aggressive tip-ins and downshifts while going up hills, riding the brakes down hills, etc.) The presently disclosed cruise control system 89 delivers smoother, steadier propulsion control and improved energy efficiency by allowing speed to vary within predefined bounds around the driver's set speed, in response to changing road grades. The cruise control system 89 achieves improved results with a novel control strategy that monitors the commands of the existing cruise control algorithm and follows a heavily filtered version of those commands when commanded torque is "close enough" to steady-state road load axle torque, allowing the driver set speed to be maintained if the vehicle encounters small changes in road load (from passenger/cargo loading, wind, or very slight grades). Also, the cruise control system 89 includes logic to detect hills in advance and assign temporary set speeds to prevent holding too high of a speed on inclines or too low of a speed on declines, and logic to better respond to driver inputs on the fly (e.g., tap commands) before allowing energy-optimized control to resume.

FIG. 3A-FIG. 3D illustrate a flowchart of a cruise control method 100. The method 100 begins at block 102. At block 102, the vehicle occupant engages cruise control and inputs the sets speed through the user interface 23. The vehicle occupant may also adjust the maximum speed and/or minimum speed deviation using the user interface 23. Because the user interface 23 is in communication with the controller 34, the controller 34 receives the set speed, and the maximum speed deviation, and the minimum speed deviation. Then, the method 100 continues to block 104.

At block 104, the controller 34 determines and stores the minimum allowed speed and the maximum allowed speed. The controller 34 may determine the minimum allowed speed and the maximum allowed speed using the set speed 25, the minimum speed deviation, and the maximum speed deviation. The maximum allowed speed and the minimum allowed speed define an allowed speed range. Then, the method 100 continues to block 106. At block 106, the controller 34 uses a standard cruise control logic to reach the set speed 25. Further, at block 106, the controller 34 determines commanded axle torque required to maintain the set speed on a flat road with no wind. Also, the controller 34 commands the propulsion system 20 of the vehicle 10 to produce the commanded axle torque to maintain the set speed on the road that is flat. Then, the controller 34 continues to block 108.

At block 108, the controller 34 determines whether each and every of the following conditions have been met, namely: (a) is the current vehicle speed within a predetermined speed threshold (e.g., five miles per hour); (b) has a predetermined amount of time (e.g., 15 seconds) passed since the last tap command; and (c) is the current axle torque within a predetermined torque threshold of the road load nominal axle torque at the set speed. The tap command is a command to increase or decrease the set speed. The vehicle occupant may input a tap command through the user interface 23 or another button. If the not all the conditions are met at block 108, then the method 100 returns to block 106. If all the conditions are met at block 108, then the method 100 continues to block 110.

At block 110, the controller 34 enters eco-cruise control. Specifically, the controller 34 monitors the final the final arbitrated torque request (i.e., the commanded axle torque command) from the standard cruise control logic and stores the final arbitrated torque request. Then, the method 100 continues to block 112. At block 112, the controller 34 applies a fading memory average filter to the commanded axle torque command with a calibratable factor to generate a filtered torque command. Next, the controller 34 saves the filtered torque command. Then, the method 100 continues to block 114.

At block 114, the controller 34 clips the filtered torque command (in case it is sufficiently far away from road load nominal axle torque) using the following equations in a sequential order:

$$\tau_{arb} = \min[\tau_{maxcomp}, \tau_{flt}] \quad \text{Eq. 1}$$

$$\tau_{arb} = \max[\tau_{arb}, \tau_{mincomp}] \quad \text{Eq. 2}$$

where:

$\tau_{arb}$ is the arbitrated torque command;

$\tau_{flt}$ is the filtered torque command;

$\tau_{maxcomp}$ is a predetermined maximum calibration value; and $\tau_{mincomp}$ is a predetermined minimum calibration value.

In other words, at block 114, the controller 34 determines the arbitrated torque command as a function of the filtered torque command using the equations above. Then, the method 100 continues to block 116. At block 116, the controller 34 commands the propulsion system 20 to produce the arbitrated torque command determined at block 114. Then, the method 100 continues to block 118.

At block 118, the controller 34 determines whether the vehicle occupant or a vehicle override has canceled cruise control. If the vehicle occupant or a vehicle override has canceled cruise control, then the method 100 continues to block 120. At block 120, the controller 34 uses standard cruise exit and/or disengage control. If the vehicle occupant or a vehicle override has not canceled cruise control, then the method 100 continues to block 122. At block 122, the controller 34 determines whether the vehicle occupant has tapped to a different set speed. In other words, the controller 34 determines whether the vehicle occupant has requested a different set speed. If the vehicle occupant has requested a different set speed, then the method 100 returns to block 106. If the vehicle occupant has not requested a different set speed, then the method 100 continues to block 124.

At block 124, the controller 34 determines whether a steep incline has been detected (i.e., determining whether the slope of the road is greater than a predetermined slope threshold). A steep incline is detected if the current vehicle acceleration is less than a predetermined acceleration threshold while the arbitrated torque command is greater than the road load nominal axle torque times a first factor. The first factor is determined through calibration. Alternatively, a steep incline is detected if the current vehicle speed is less than an eco-exit threshold. The eco-exit threshold is equal to a second factor times the minimum allowed speed. The second factor is determined through calibration. If a steep incline is detected, then the method 100 continues to block 142. If no steep incline has been detected, then the method 100 continues to block 126.

At block 126, the controller 34 determines whether a steep decline has been detected (i.e., determining whether the slope of the road is less than a predetermined slope threshold). A steep decline is detected if the current vehicle acceleration is greater than a predetermined acceleration threshold while the arbitrated torque command is less than the road load nominal axle torque times a third factor. The third factor is determined through calibration. Alternatively, a steep decline is detected if the current speed is less than an eco-exit threshold. This eco-exit threshold is equal to a fourth factor times the maximum allowed speed. If no steep decline is detected, then the method 100 proceeds to block 127. At block 127, the controller 34 commands the propulsion system 20 to remain in the eco-torque control mode. Further, at block 127, the controller 34 monitors the final arbitrated torque command from the standard cruise control logic and stores the final arbitrated torque command. After block 127, the method 100 returns to block 112. If a steep decline is detected, then the method 100 continues to block 128.

At block 128, the controller 34 enters overspeed control. During overspeed control, the controller 34 sets a temporary set speed. The temporary speed is equal to equal to the maximum allowed speed times a fifth factor. The fifth factor is a calibrated value. Further, at block 128, the controller 34 uses standard, unfiltered cruise control commanded torque to maintain the temporary set speed. Then, the method 100 continues to block 130.

At Block 130, the Controller 34 Sets the Arbitrated Cruise Torque Command Using the Following Equations in Sequential Order:

$$\tau_{arb} = \min[0, \tau_{std}] \quad \text{Eq. 3}$$

$$\tau_{arb} = \min[\tau_{arb}, \tau_{mincomp}] \quad \text{Eq. 4}$$

where:

$\tau_{arb}$ is the arbitrated torque command;

$\tau_{std}$ is the road load nominal axle torque at the set speed; and $\tau_{mincomp}$ is a predetermined minimum calibration value.

This prevents lingering at the high temporary set speed after the decline has passed. Then, the method 100 proceeds to block 132. At block 132, the controller 34 determines whether the vehicle occupant or a vehicle override has canceled cruise control. If the vehicle occupant or a vehicle override has canceled cruise control, then the method 100 continues to block 134. At block 134, the controller 34 uses standard cruise exit and/or disengages cruise control. If the vehicle occupant or a vehicle override has not canceled cruise control, then the method 100 continues to block 136. At block 136, the controller 34 determines whether the vehicle occupant has tapped to a different set speed. In other words, the controller 34 determines whether the vehicle occupant has requested a different set speed. If the vehicle occupant has requested a different set speed, then the method 100 returns to block 106. If the vehicle occupant has not requested a different set speed, then the method 100 continues to block 138.

At block 138, the controller 34 determines whether each and every of the following conditions have been met, namely: (a) has a predetermined amount of time (e.g., 15 seconds) passed since the steep decline was detected; (b) is the current vehicle speed less than a predetermined speed threshold, wherein the predetermined speed threshold is equal to the minimum allowed speed times a sixth factor; and (c) is the current axle torque greater a predetermined torque threshold, wherein the predetermined torque threshold is equal to a seventh factor times the road load nominal axle torque at the set speed. The sixth factor and the seventh factors are determined through calibration. If all the conditions are met at block 138, then the method 100 returns to block 110. If not all the conditions are met at block 138, then the method 100 continues to block 140.

At block 140, the system 89 remains in overspeed control. Further, at block 140, the controller 34 uses the standard, unfiltered cruise control torque command to maintain the temporary set speed. After block 140, the method 100 returns to block 130.

Returning to block 124, if a steep incline is detected, then the method 100 continues to block 142. At block 142, the system 89 enters underspeed control. During underspeed control, the controller 34 sets a temporary set speed. The temporary speed equals the minimum allowed speed times an eight factor. The eight factor may be determined through calibration. Further, the controller 34 uses the standard, unfiltered cruise control torque command to maintain the temporary set speed. Then, the method 100 continues to block 144.

At block 144, the controller 34 sets the arbitrated cruise torque command using the following equation:

$$\tau_{arb} = \max[0, \tau_{std}] \quad \text{Eq. 5}$$

where:

$\tau_{arb}$ is the arbitrated torque command; and $\tau_{std}$ is the road load nominal axle torque at the set speed.

This prevents lingering at the low temporary set speed after the incline has passed. Then, the method 100 continues to block 146. At block 146, the controller 34 determines whether the vehicle occupant or a vehicle override has canceled cruise control. If the vehicle occupant or a vehicle override has canceled cruise control, then the method 100 continues to block 148. At block 148, the controller 34 uses standard cruise exit and/or disengage control. If the vehicle occupant or a vehicle override has not canceled cruise control, then the method 100 continues to block 150. At block 150, the controller 34 determines whether the vehicle occupant has tapped to a different set speed. In other words, the controller 34 determines whether the vehicle occupant has requested a different set speed. If the vehicle occupant has requested a different set speed, then the method 100 returns to block 106. If the vehicle occupant has not requested a different set speed, then the method 100 continues to block 152.

At block 152, the controller 34 determines whether each and every of the following conditions have been met, namely: (a) has a predetermined amount of time (e.g., 15 seconds) passed since the steep incline was detected; (b) is the current vehicle speed greater than a predetermined speed threshold, wherein the predetermined speed threshold is equal to the minimum allowed speed times a ninth factor; and (c) is the current axle torque less a predetermined torque threshold, wherein the predetermined torque threshold is equal to a tenth factor times the road load nominal axle torque at the set speed. The ninth factor and the tenth factor are determined through calibration. If all the conditions are met at block 152, then the method 100 returns to block 110. If not all the conditions are met at block 152, then the method 100 continues to block 154.

At block 154, the system 89 remains in underspeed control. Further, at block 154, the controller 34 uses the standard, unfiltered cruise control torque command to maintain the temporary set speed. After block 154, the method 100 returns to block 144.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A cruise control method for a vehicle, comprising:
receiving a set speed, a maximum allowed speed, and a minimum allowed speed, wherein the maximum allowed speed and the minimum allowed speed define an allowed speed range;
determining a commanded axle torque to maintain the set speed on a flat portion of a road;
commanding a propulsion system of the vehicle to produce the commanded axle torque to maintain the set speed on the flat portion of the road;
applying a fading memory filter to the commanded axle torque to generate a filtered torque command;
determining an arbitrated torque command as a function of the filtered torque command;
command the propulsion system of the vehicle to produce the arbitrated torque command;
determining that a slope of a sloped portion of the road is greater than a predetermined slope threshold;
setting a temporary set speed in response to determining that the slope of the road is greater than the predetermined slope threshold; and
commanding the propulsion system of the vehicle to maintain the vehicle at the temporary speed while the vehicle travels along the sloped portion of the road, and wherein the arbitrated torque command based on the filtered torque command using the following equation in sequential order:

$$\tau_{arb} = \min[\tau_{maxcomp}, \tau_{flt}]$$

$$\tau_{arb} = \max[\tau_{arb}, \tau_{mincomp}]$$

where:
$\tau_{arb}$ is the arbitrated torque command;
$\tau_{flt}$ is the filtered torque command;
$\tau_{maxcomp}$ is a predetermined maximum calibration value; and
$\tau_{mincomp}$ is a predetermined minimum calibration value.

2. The method of claim 1, wherein determining that the slope of the road is greater than a predetermined slope threshold includes detecting an incline on the road that is greater than the slope threshold.

3. The method of claim 2, wherein detecting the incline on the road includes determining that an acceleration of the vehicle is less than a predetermined acceleration threshold.

4. The method of claim 2, wherein detecting the incline on the road includes determining that a speed of the vehicle is less than a predetermined speed threshold.

5. The method of claim 1, wherein determining that the slope of the road is greater than a predetermined slope threshold includes detecting a decline on the road that is greater than the slope threshold.

6. The method of claim 5, wherein detecting the decline on the road that is greater than the slope threshold includes determining that an acceleration of the vehicle is greater than a predetermined acceleration threshold.

7. The method of claim 5, wherein detecting the decline on the road that is greater than the slope threshold includes determining that a speed of the vehicle is greater than a predetermined speed threshold.

8. A system, comprising:
a plurality of sensors; and
a controller in communication with the plurality of sensors, wherein the controller is programmed to:
receive a set speed, a maximum allowed speed, and a minimum allowed speed, wherein the maximum allowed speed and the minimum allowed speed define an allowed speed range;
determining a commanded axle torque to maintain the set speed on a flat portion of a road;
command a propulsion system of a vehicle to produce the commanded axle torque to maintain the set speed on the flat portion of the road;
apply a fading memory filter to the commanded axle torque to generate a filtered torque command;
determine an arbitrated torque command as a function of the filtered torque command;
command the propulsion system of the vehicle to produce the arbitrated torque command;
determine that a slope of a sloped portion of the road is greater than a predetermined slope threshold;
set a temporary set speed in response to determining that the slope of the sloped portion of the road is greater than the predetermined slope threshold; and
command the propulsion system of the vehicle to maintain the vehicle at the temporary speed while the vehicle travels along the sloped portion of the road, wherein the arbitrated torque command based on the filtered torque command using the following equation in sequential order:

$$\tau_{arb}=\min[\tau_{maxcomp},\tau_{flt}]$$

$$\tau_{arb}=\max[\tau_{arb},\tau_{mincomp}]$$

where:
$\tau_{arb}$ is the arbitrated torque command;
$\tau_{flt}$ is the filtered torque command;
$\tau_{maxcomp}$ is a predetermined maximum calibration value; and
$\tau_{mincomp}$ is a predetermined minimum calibration value.

9. The system of claim 8, wherein the controller is programmed to determine that the slope of the road is greater than the predetermined slope threshold by detecting an incline on the road that is greater than the slope threshold.

10. The system of claim 9, wherein the controller is programmed to detect the incline on the road that is greater than the slope threshold by determining that an acceleration of the vehicle is less than a predetermined acceleration threshold.

11. The system of claim 10, wherein the controller is programmed to detect the incline on the road that is greater than the slope threshold by determining that a speed of the vehicle is less than a predetermined speed threshold.

12. The system of claim 8, wherein the controller is programmed to determine that the slope of the road is greater than the predetermined slope threshold by detecting a decline on the road that is greater than the slope threshold.

13. The system of claim 12, wherein the controller is programmed to detect that the decline on the road is greater than the slope threshold includes determining that an acceleration of the vehicle is greater than a predetermined acceleration threshold.

14. The system of claim 12, wherein the controller is programmed to detect that the decline on the road is greater than the slope threshold includes determining that a speed of the vehicle is greater than a predetermined speed threshold.

15. A tangible, non-transitory, machine-readable medium, comprising machine-readable instructions, that when executed by a processor, cause the processor to:
receive a set speed, a maximum allowed speed, and a minimum allowed speed, wherein the maximum allowed speed and the minimum allowed speed define an allowed speed range;
determine a commanded axle torque to maintain the set speed on a flat portion of a road;
command a propulsion system of a vehicle to produce the commanded axle torque to maintain the set speed on the flat portion of the road;
apply a fading memory filter to the commanded axle torque to generate a filtered torque command;
determine an arbitrated torque command as a function of the filtered torque command;
command the propulsion system of the vehicle to produce the arbitrated torque command;
determine that a slope of a sloped portion of the road is greater than a predetermined slope threshold;
set a temporary set speed in response to determining that the slope of the sloped portion of the road is greater than the predetermined slope threshold; and
command the propulsion system of the vehicle to maintain the vehicle at the temporary speed while the vehicle travels along the sloped portion of the road,
wherein the arbitrated torque command based on the filtered torque command using the following equation in sequential order:

$$\tau_{arb}=\min[\tau_{maxcomp},\tau_{flt}]$$

$$\tau_{arb}=\max[\tau_{arb},\tau_{mincomp}]$$

where:
$\tau_{arb}$ is the arbitrated torque command;
$\tau_{flt}$ is the filtered torque command;
$\tau_{maxcomp}$ is a predetermined maximum calibration value; and
$\tau_{mincomp}$ is a predetermined minimum calibration value.

16. The tangible, non-transitory, machine-readable medium of claim 15, wherein the controller is programmed to determine that the slope of the road is greater than the predetermined slope threshold by detecting an incline on the road that is greater than the slope threshold.

17. The tangible, non-transitory, machine-readable medium of claim 15, wherein the controller is programmed to detect the incline on the road that is greater than the slope threshold by determining that an acceleration of the vehicle is less than a predetermined acceleration threshold.

* * * * *